(12) United States Patent
Kirsch et al.

(10) Patent No.: US 6,929,242 B2
(45) Date of Patent: Aug. 16, 2005

(54) HIGH FORCE SOLENOID AND SOLENOID-DRIVEN ACTUATOR

(75) Inventors: Bernhard Kirsch, Mandelbachtal (DE); Manfred Muschalle, Milwaukee, WI (US)

(73) Assignee: Thomas Magnete GmbH (DE)

( * ) Notice: Subject to any disclaimer, the term of this patent is extended or adjusted under 35 U.S.C. 154(b) by 55 days.

(21) Appl. No.: 10/365,234

(22) Filed: Feb. 11, 2003

(65) Prior Publication Data

US 2004/0155214 A1 Aug. 12, 2004

(51) Int. Cl.[7] .............................................. F16K 31/02
(52) U.S. Cl. ................... 251/129.15; 335/281
(58) Field of Search ...................... 251/30.01, 129.15; 384/279, 412, 908, 912; 335/251, 255, 256, 281

(56) References Cited

U.S. PATENT DOCUMENTS

| | | | |
|---|---|---|---|
| 4,586,885 A | * 5/1986 | Middlekauff | ............... 418/61.3 |
| 5,232,196 A | 8/1993 | Hutchings et al. | |
| 5,261,637 A | 11/1993 | Curnow | |
| 5,435,519 A | 7/1995 | Everingham | |
| 5,467,962 A | 11/1995 | Bircann et al. | |
| 5,494,255 A | 2/1996 | Pearson et al. | |
| 5,571,248 A | * 11/1996 | Seetharaman et al. | . 137/625.65 |
| 5,779,220 A | 7/1998 | Nehl et al. | |
| 6,367,766 B1 | 4/2002 | Briant et al. | |
| 6,374,814 B1 | 4/2002 | Cook et al. | |
| 6,409,144 B1 | * 6/2002 | Inami | ..................... 251/129.15 |
| 6,612,544 B2 | * 9/2003 | Sakata et al. | .......... 251/129.15 |

* cited by examiner

Primary Examiner—Edward K. Look
Assistant Examiner—John K. Fristoe, Jr.
(74) Attorney, Agent, or Firm—Jansson, Shupe, Munger & Antaramian, Ltd.

(57) ABSTRACT

A solenoid having increased axial force and low static friction on the armature is disclosed and provides an improved solenoid-driven hydraulic valve actuator. The solenoid includes a coil member, a pole piece having an inside surface with recessed and non-recessed portions to form an inner recess in the pole piece, an armature inside the pole piece, and a bearing held in the recess between the pole piece and armature, the bearing having an inner surface extending inwardly just beyond the inside surface of the pole piece non-recessed portion.

15 Claims, 3 Drawing Sheets

HIGH FORCE SOLENOID AND SOLENOID-DRIVEN ACTUATOR

FIELD OF THE INVENTION

This invention is related generally to solenoid technology, such as is used to drive actuators of various types. More particularly, the invention relates to the field of solenoid-driven hydraulic valve actuators for applications in which high solenoid force, rapid actuation, or extended actuator life are required.

BACKGROUND OF THE INVENTION

A number of advances in internal combustion engine technology include the application of solenoid-driven hydraulic valve actuators to provide more precise control over a number of engine functions such as control of the exhaust valves and fuel injectors. Hydraulic actuators used in applications such as these require the actuator to accelerate rapidly (have high axial output force), to be extremely reliable (i.e., operate for a great number of cycles during the life of the actuator assembly), and to have very low hysteresis.

Thus, there is a need for solenoid-driven actuators which are fast-acting and precisely controllable and which have long operational lives. Also, there is a more general need for improved solenoids for a variety of solenoid applications. Various solenoid structures have been created with certain of these objectives in mind, and examples will be discussed briefly at the end of this background section.

In considering what may be necessary to achieve the desired performance, it is important to minimize the gap in the magnetic circuit between the armature of the solenoid and the surrounding structure of the solenoid which shapes the magnetic field acting on the armature. Such a configuration increases the axial output force of the solenoid, which in turn causes the actuator driven by the solenoid to accelerate more quickly.

At the same time, however, in order to prevent failure of the actuator driven by the solenoid, it is extremely important to minimize the lateral forces (side forces) on the moving components of the hydraulic valve actuator. This minimizes wear of the actuator components. Achieving long life can be accomplished by the combination of precise bearing support for the armature of the solenoid and minimizing the transmission of any residual lateral forces from the armature to the driven component of the actuator.

In addition, the static friction of the armature within the solenoid should be kept to a minimum in order to reduce or eliminate hysteresis. (In this context, hysteresis refers to the unwanted lag in the commanded displacement of the armature due to static friction between the armature and the core of the solenoid.) Achieving low static friction can be accomplished by reducing the bearing contact surface and, of course, by constructing the bearing contact surfaces out of low static friction materials.

The engineering reasoning discussed above undergirds the present invention. The present invention addresses all of the needs described above and thus provides an improved solenoid and solenoid-driven hydraulic valve actuator with high axial driving forces, precise performance, high reliability, and long life.

Examples of prior solenoids and hydraulic valve actuators with characteristics of interest include U.S. Pat. Nos. 5,435,519, 5,467,962 and 5,494,255, which disclose various solenoid-driven valve actuators. The solenoids of these devices each have a fairly small gap between a pole piece and the armature. In each case, however, there is a long bearing surface which, as discussed above, can tend to add unwanted static friction, leading to possible hysteresis. In certain of these prior devices, because of the nature of the bearing materials, the fairly small gaps (between the pole pieces and the armatures) are not as small as may be desired to maximize solenoid performance.

Despite various developments in the past, given the extreme performance specifications required of components for high-performance engines there remains a need for improved solenoids and solenoid-driven actuators which are fast-acting and precisely controllable and which have long operational lives.

OBJECTS OF THE INVENTION

It is an object of this invention, in the field of solenoid technology, to provide a solenoid with increased axial output force which overcomes some of the problems and shortcomings of the prior art.

Another object of this invention is to provide an improved solenoid with excellent bearing support for the solenoid armature while at the same time achieving high axial output force.

Another object of this invention is to provide an improved solenoid which maximizes the axial output force for a given volume of solenoid.

Another object of this invention is to provide an improved solenoid design which minimizes the gap between the solenoid pole piece and the solenoid armature.

Another object of this invention is to provide an improved solenoid which minimizes the lateral forces it places on the components of the hydraulic valve actuator it drives.

Another object of this invention is to provide an improved solenoid-driven hydraulic valve actuator which has increased operational life.

Still another object of this invention is to provide an improved solenoid with decreased hysteresis.

These and other objects of the invention will be apparent from the following descriptions and drawings of preferred embodiments of the invention.

SUMMARY OF THE INVENTION

The present invention is an improved solenoid and an improved solenoid-driven hydraulic actuator using such solenoid. The invention overcomes the above-noted problems and shortcomings and satisfies the objects of the invention.

The solenoid of this invention is of the type having a coil member, a pole piece with an inside surface, an armature inside the pole piece, and a bearing surface engaging the armature. In the improved solenoid, the inside surface of the pole piece has a recessed portion and a non-recessed portion, the recessed portion forming a recess in the pole piece. A bearing is held in the recess with the bearing having an inner surface extending radially inwardly (i.e., located) just beyond the non-recessed portion of the inside surface.

The improved solenoid produces increased axial force of the armature by virtue of the proximity of the pole piece to the armature. In other words, the gap in the magnetic circuit is made small, increasing the effect of the magnetic field, and the bearing contact surface against the armature is relatively small, thereby reducing static friction and related problems such as hysteresis as discussed above.

In preferred embodiments, the inner surface of the bearing is of a low-friction polymer bearing compound. In highly preferred embodiments, the bearing includes (1) a steel backing layer, (2) a porous bronze layer, and (3) a polytetrafluorethylene/lead overlay layer. Such bearings are referred to as DU bearings.

In preferred embodiments, the pole piece is axially symmetric and the bearing is a cylindrical sleeve bearing. In a highly preferred embodiment, the pole piece has first and second ends oriented toward the retracted and extended positions of the armature, respectively, with the bearing being positioned at the first end of the pole piece and the recess being a step at the first end of the pole piece.

In some embodiments of the inventive solenoid, the bearing may be comprised of a plurality of spaced-apart bearing sections.

The present invention also includes an improved solenoid-driven hydraulic valve actuator which is of the type including (a) a solenoid having a coil member, a pole piece with an inside surface, an armature inside the pole piece, and a bearing surface engaging the armature, (b) a pilot spool valve driven by the armature, and (c) a piston slidably engaged by the pilot spool valve and driving an actuated member. The improved solenoid-driven hydraulic valve actuator includes a solenoid in which the inside surface of the pole piece has recessed and non-recessed portions, the recessed portion forming a pole piece recess in which a bearing is held as described above—i.e., with its inner surface positioned just radially inwardly of the non-recessed portion of the inside surface of the pole piece. In this improved solenoid-driven hydraulic valve actuator, the axial force initiating valve actuation is increased.

The armature of the solenoid engages and drives the pilot spool and, in certain highly preferred embodiments, the actuator includes a convex armature/pilot-spool contact (i.e., interface). Most preferably, the convex armature/pilot-spool contact surface involves a convex contact surface on the armature.

The piston of the actuator engages an actuated member and, in certain highly preferred embodiments, there is a convex piston/actuated-member contact (i.e., interface). Preferably, the convex piston/actuated-member contact involves a convex contact surface on the piston. It the most preferred embodiments there are convex contacts both at the armature/pilot-spool interface and at the piston/actuated-member interface.

The hydraulic valve actuator of this invention, with its improved solenoid as described above, provides significant operational improvement. The embodiments of the invention which combine the improved solenoid with the above-described convex contacts at both the armature/pilot-spool interface and the piston/actuated-member interface provide further enhanced operational improvement.

BRIEF DESCRIPTION OF THE DRAWINGS

The drawings illustrate preferred embodiments which include the above-noted characteristics and features of the invention. The invention will be readily understood from the descriptions and drawings.

In the drawings.

DETAILED DESCRIPTION OF PREFERRED EMBODIMENTS

Figure 1:
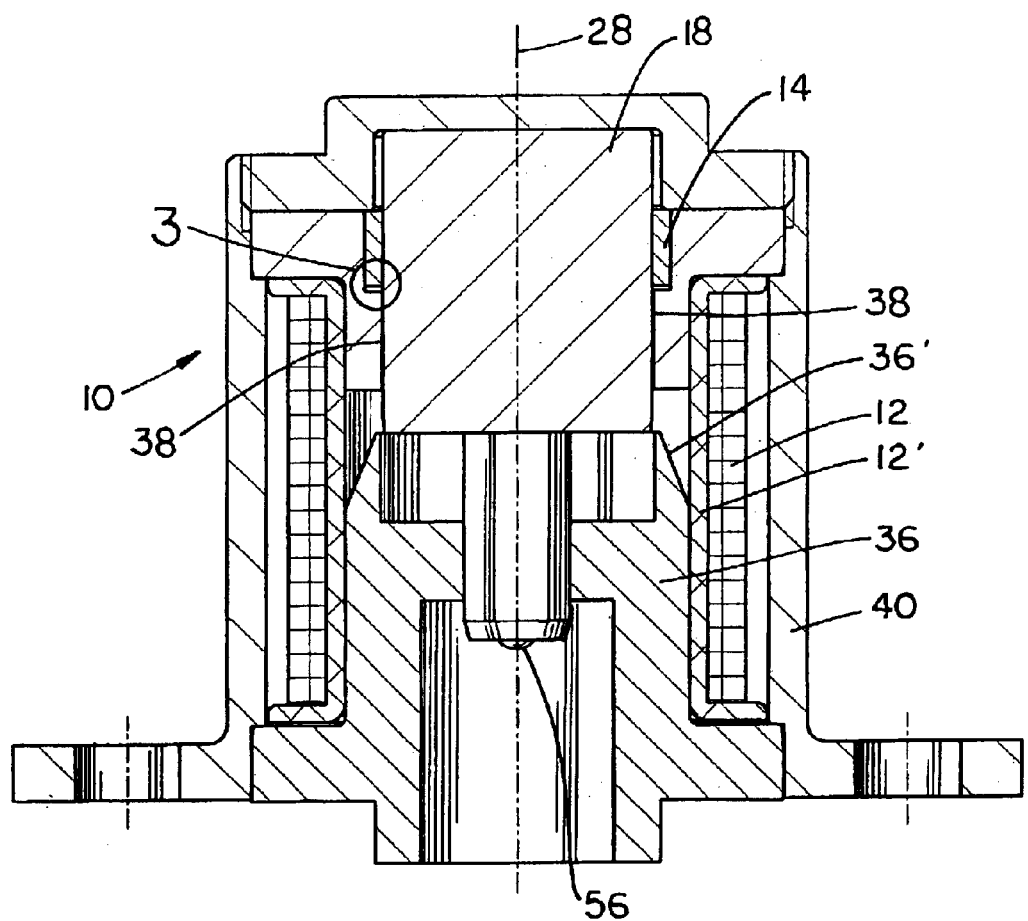
FIG. 1 is a cross-sectional view of a solenoid in accordance with a preferred embodiment of the invention.
Figure 2:
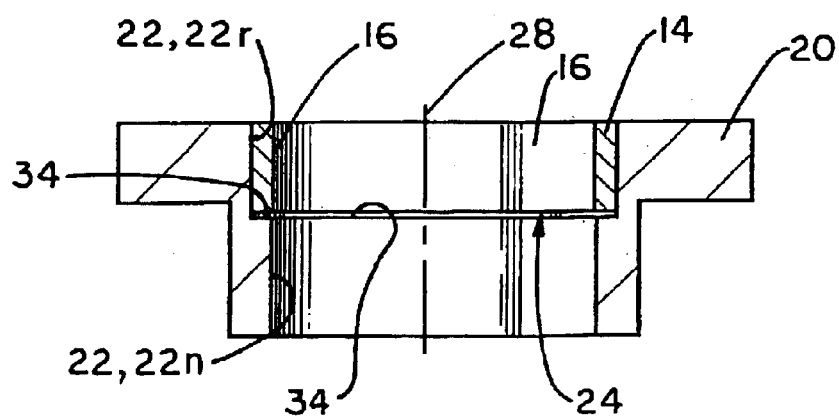
FIG. 2 is an enlarged cross-sectional view of the pole piece of such solenoid.
Figure 5:
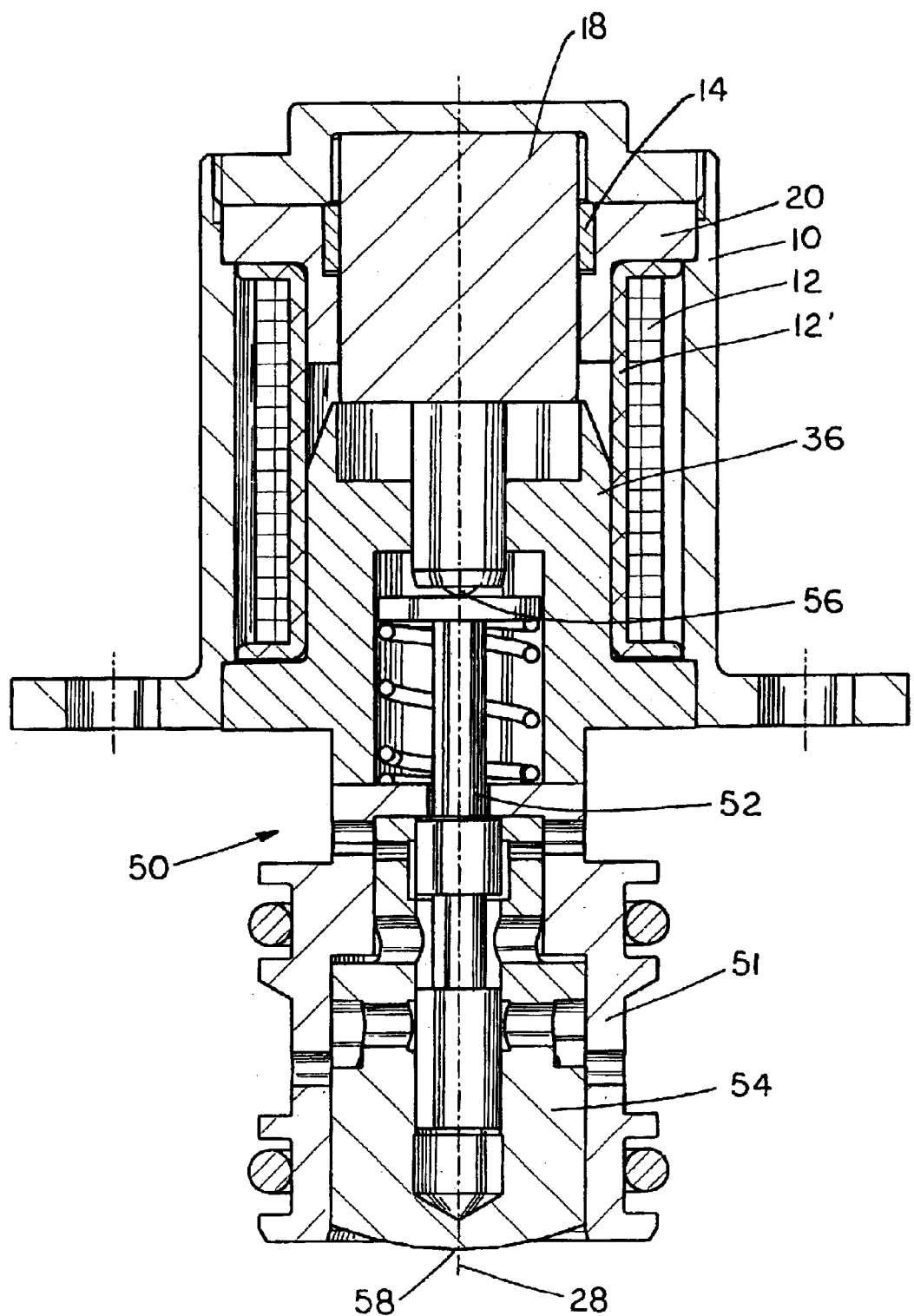
FIG. 5 is a cross-sectional view of the inventive solenoid-driven hydraulic valve actuator, which includes the improved solenoid of FIGS. 1–3.

The figures illustrate preferred embodiments of this invention, FIG. 1 showing solenoid 10 and FIG. 5 showing a solenoid-driven hydraulic valve actuator 50 which is driven by solenoid 10.

Solenoid 10 and solenoid-driven valve actuator 50 are cylindrical; i.e., their major elements are generally axially-symmetric around centerline axis 28. Centerline axis 28 is the axis of the structures in each of FIGS. 1–3 and 5.

Solenoid 10 includes a coil 12 (wound on a bobbin 12') and an armature 18. When coil 12 is energized with electrical current, it produces a magnetic field that exerts a force on armature 18 in a direction parallel to centerline axis 28. The general functionality of electromagnetic solenoids such as solenoid 10 is well-known to those skilled in the art and will not be described in detail herein.

A first pole piece 20 of particular concern in this invention is used to direct the magnetic field produced by coil 12 and is part of a magnetic circuit which also includes armature 18, a gap 38, a second pole piece 36 having a conical end 36', a gap (not shown) between armature 18 and second pole piece 36, and solenoid housing 40.

As described above, it is desirable to minimize gap 38 between armature 18 and pole piece 20 while supporting armature 18 in its movement within solenoid 10. Pole piece 20 (shown best in FIG. 2) is configured to facilitate these objectives. Bearing 14 is a cylindrical sleeve bearing of the type referred to as a DU bearing. DU bearing 14 is held in an inner recess 24 in pole piece 20—i.e., in a location bounded outwardly by a recessed portion 22r of inside surface 22 of pole piece 20. Recessed portion 22r is formed by fabricating a step 34 along inside surface 22; the non-recessed portion of inside surface 22 is identified by numeral 22n.

Armature 18 is guided by inner surface 16 of bearing 14. As shown best in FIGS. 2 and 3, particularly in FIG. 3, inner surface 16 of bearing 14 extends inwardly just beyond non-recessed portion 22n of inside surface 22 of pole piece 20; i.e., inner surface 16 is located just radially inward of non-recessed surface 22n. In other words, in this generally cylindrical configuration, the inside diameter of bearing 14 is just slightly smaller than the diameter of non-recessed portion 22n of pole piece 20, thereby minimizing gap 38 while supporting armature 18. As the figures show, gap 38 is very small and armature 18 is free of contact with pole piece 20 and bearing 14 along much of the length of pole piece 20.

Hydraulic valve actuator 50 of FIG. 5 is driven by solenoid 10 like that described above. Actuator 50 includes, in addition to solenoid 10, an actuator housing 51, a pilot spool valve 52 and a piston 54. Details of the force-amplifying operation of an hydraulic actuator of the type including a pilot spool valve and a piston are well-known by those skilled in the art. Described generally, piston 54 follows the position of pilot spool valve 52, which is driven by a contact surface 56 of armature 18 of solenoid 10, while hydraulic forces made available by the relative positions of pilot spool valve 52, piston 54 and housing 51 amplify the output force available at the output end 58 of piston 54 of hydraulic actuator 50.

Inclusion of improved solenoid 10 in a hydraulic valve actuator of the type described significantly improves operation of the actuator.

As described above, in order to achieve long and reliable actuator life (e.g., as measured by the number of cycles of operation), it is advantageous to reduce as much as possible the lateral forces which act on pilot spool valve 52 and piston 54. Thus, as illustrated in FIG. 5, contact surface 56 of armature 18 is configured with a convex shape to minimize the transmission to pilot spool valve 52 of any lateral forces which may arise from the operation of armature 18 within solenoid 10. And, as also shown in FIG. 5, actuator output end 58 has a convex shape for contact with an actuated member (not shown) in order to minimize the transmission to piston 54 of any lateral forces which may arise from the operation of the actuated member driven by piston 54. Both of these force-applying interfaces are configured to achieve the desired decoupling of lateral forces.

Solenoid-driven hydraulic valve actuator 50, which combines inventive solenoid 10 and both of the lateral force decoupling interfaces just described, provides substantial operational advantages.

Figure 4:
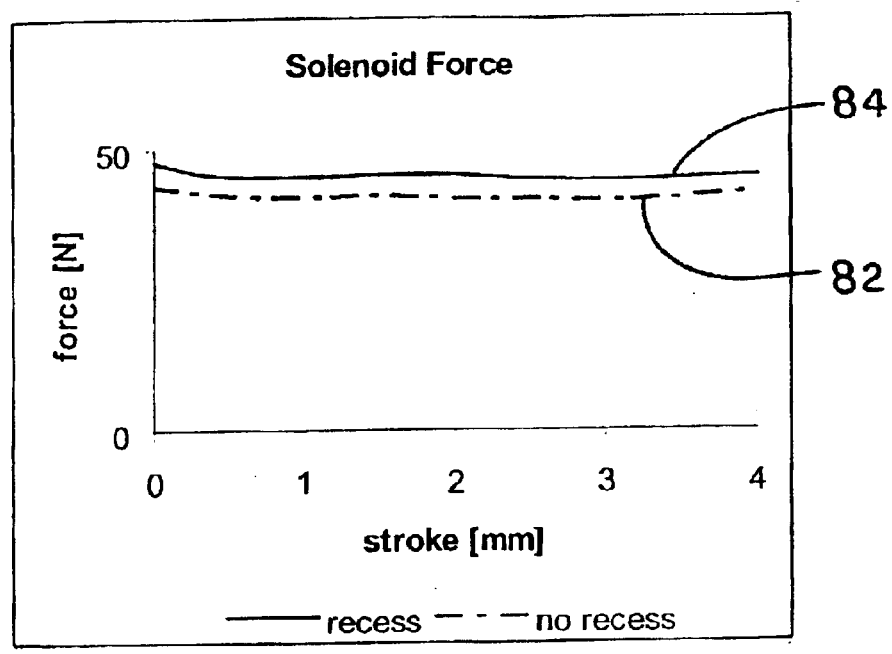
FIG. 4 is a graph illustrating the increased force available in a solenoid of the invention compared to a solenoid having a non-recessed pole piece and using the same bearing.
Figure 3:
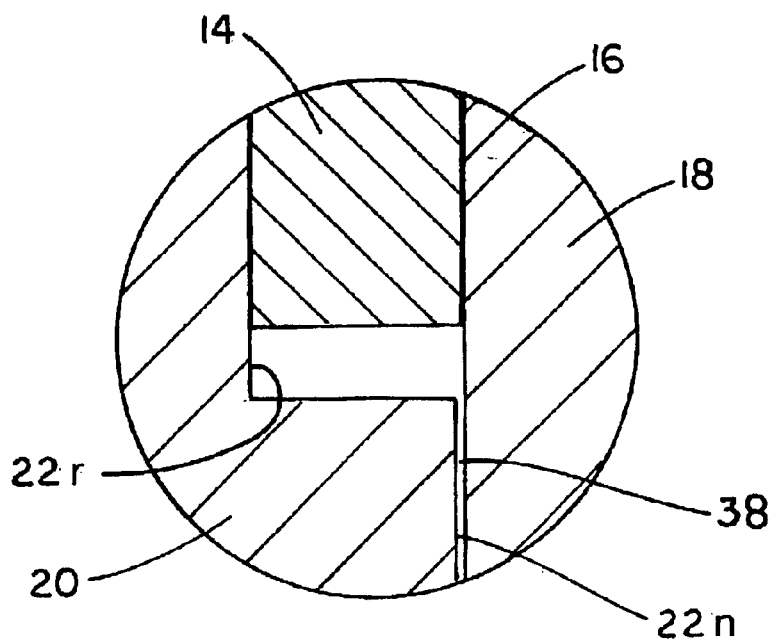
FIG. 3 is a further enlarged fragmentary view of a portion of FIG. 1 as indicated in FIG. 1.

The graph of FIG. 4 illustrates the increased force available in a solenoid of the invention compared to a solenoid having a non-recessed pole piece and using the same bearing. The comparison shown is for a typically-sized solenoid and is for purposes of illustration only. Curves 82 and 84 show the axial force available from the solenoid output as a function of stroke (movement of armature 18 along centerline axis 28). Curve 84 illustrates the force available from solenoid 10 as configured in FIG. 1, while curve 82 illustrates the force available from an identical solenoid but using a pole piece without a recessed portion (i.e., with a gap corresponding to the thickness of the bearing).

Curve 84 represents an average increase in axial force of approximately 9% over the axial force from the solenoid using a pole piece without the recessed portion.

Since armature 18 contacts bearing 14 along bearing inner surface 16, whatever gap (of molecular thickness) that remains between bearing 14 and armature 18 along bearing inner surface 16 is slightly smaller than gap 38 between armature 18 and non-recessed inside surface 22n of pole piece 20. This is important since the material of which bearing 14 is made conducts the magnetic flux much like the steel of pole piece 20. Thus, another configuration with which to compare the improved solenoid of this invention is one having a non-recessed pole piece that includes a bearing surface similar to that of bearing 14 but extending along the full length of the pole piece. Such a device results in undesirable additional static friction associated with the extended length of the bearing contact surface. The inventive solenoid is functionally superior to such device and generates greater axial output forces than such device.

While the principles of the invention have been shown and described in connection with specific embodiments, it is to be understood that such embodiments are by way of example and are not limiting.

What is claimed is:

1. In a solenoid having a coil member, a pole piece with an inside surface, an armature inside the pole piece, and a bearing surface engaging the armature, the improvement wherein:
   the inside surface of the pole piece has recessed and non-recessed portions, the recessed portion forming a recess in the pole piece; and
   a low-friction bearing having a steel backing layer, a porous bronze layer and a polytetrafluorethylene/lead overlay layer, the bearing being held in the recess and having an inner surface extending inwardly just beyond the inside surface of the non-recessed portion of the pole piece inside surface,
whereby the axial force of the armature is increased by virtue of the proximity of the pole piece to the armature.

2. In a hydraulic valve actuator including (a) a solenoid having a coil member, a pole piece with an inside surface, an armature inside the pole piece, and a bearing surface engaging the armature, (b) a pilot spool valve driven by the armature, (c) a piston slidably engaged by the pilot spool valve and driving an actuated member, the improvement wherein:
   the inside surface of the pole piece has recessed and non-recessed portions, the recessed portion forming a recess in the pole piece; and
   a low-friction bearing having a steel backing layer, a porous bronze layer and a polytetrafluorethylene/lead overlay layer, the bearing being held in the recess and having an inner surface extending inwardly just beyond the inside surface of the non-recessed portion of the pole piece inside surface,
whereby the axial force initiating valve actuation is increased.

3. In a solenoid having a coil member, a pole piece with an inside surface, an armature inside the pole piece, and a bearing surface engaging the armature, the improvement wherein:
   the inside surface of the pole piece has recessed and non-recessed portions, the recessed portion forming a recess in the pole piece, the pole piece having first and second ends oriented respectively toward the retracted and extended positions of the armature; and
   a bearing is held in the recess positioned at the first end of the pole piece and has an inner surface extending inwardly just beyond the inside surface of the non-recessed portion of the pole piece inside surface,
whereby the axial force of the armature is increased by virtue of the proximity of the pole piece to the armature.

4. The solenoid of claim 3 wherein the recess is a step at the first end of the pole piece.

5. The solenoid of claim 4 wherein:
   the pole piece is axially symmetric; and
   the bearing is a cylindrical sleeve bearing.

6. The solenoid of claim 5 wherein the bearing comprises:
   a steel backing layer;
   a porous bronze layer; and
   a polytetrafluorethylene/lead overlay layer.

7. In a hydraulic valve actuator including (a) a solenoid having a coil member, a pole piece with an inside surface, an armature inside the pole piece, and a bearing surface engaging the armature, (b) a pilot spool valve driven by the armature, (c) a piston slidably engaged by the pilot spool valve and driving an actuated member, the improvement wherein:
   the inside surface of the pole piece has recessed and non-recessed portions, the recessed portion forming a recess in the pole piece, the pole piece having first and second ends oriented respectively toward the retracted and extended positions of the armature; and
   a bearing is held in the recess positioned at the first end of the pole piece and has an inner surface extending inwardly just beyond the inside surface of the non-recessed portion of the pole piece inside surface, whereby the axial force initiating valve actuation is increased.

8. The actuator of claim 7 wherein the recess is a step at the first end of the pole piece.

9. The actuator of claim 8 wherein the pole piece is axially symmetric; and the bearing is a cylindrical sleeve bearing.

10. The actuator of claim 9 wherein the bearing comprises:

a steel backing layer;

a porous bronze layer; and a polytetrafluorethylene/lead overlay layer.

11. In a hydraulic valve actuator including (a) a solenoid having a coil member, a pole piece with an inside surface, an armature inside the pole piece, and a bearing surface engaging the armature, (b) a pilot spool valve driven by the armature, (c) a piston slidably engaged by the pilot spool valve and driving an actuated member, the improvement wherein:

the inside surface of the pole piece has recessed and non-recessed portions, the recessed portion forming a recess in the pole piece;

a bearing is held in the recess and has an inner surface extending inwardly just beyond the inside surface of the non-recessed portion of the pole piece inside surface; and the actuator further includes a convex armature/pilot-spool contact, whereby the axial force initiating valve actuation is increased.

12. The actuator of claim 11 wherein the convex armature/pilot-spool contact includes a convex contact surface on the armature.

13. In a hydraulic valve actuator including (a) a solenoid having a coil member, a pole piece with an inside surface, an armature inside the pole piece, and a bearing surface engaging the armature, (b) a pilot spool valve driven by the armature, (c) a piston slidably engaged by the pilot spool valve and driving an actuated member, the improvement wherein:

the inside surface of the pole piece has recessed and non-recessed portions, the recessed portion forming a recess in the pole piece;

a bearing is held in the recess and has an inner surface extending inwardly just beyond the inside surface of the non-recessed portion of the pole piece inside surface; and the actuator further includes a convex piston/actuated-member contact, whereby the axial force initiating valve actuation is increased.

14. The actuator of claim 13 wherein the convex piston/actuated-member contact includes a convex contact surface on the piston.

15. The actuator of claim 13 further including a convex armature/pilot-spool contact.

* * * * *